(12) United States Patent
Baldas et al.

(10) Patent No.: US 6,385,816 B1
(45) Date of Patent: May 14, 2002

(54) HANDLE FOR A VEHICLE LIFT GATE

(75) Inventors: Jason P. Baldas, Warren; Jeff A. Kempf, Romeo; Adam J. Canni, Auburn Hills; Marilyn D. Vala, Rochester, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/512,505

(22) Filed: Feb. 24, 2000

(Under 37 CFR 1.47)

Related U.S. Application Data

(60) Provisional application No. 60/121,992, filed on Feb. 27, 1999.

(51) Int. Cl.[7] ............................................... A45C 13/22
(52) U.S. Cl. ................................ 16/412; 16/408; 16/4; 296/146.8
(58) Field of Search ........................... 16/113.1, 408, 16/421, 413, 425, 418, 412, 438; 296/146.8; 312/22, 24, 27, 299; 292/DIG. 30, 42, 43

(56) References Cited

U.S. PATENT DOCUMENTS

| | | | | |
|---|---|---|---|---|
| 3,808,634 A | * | 5/1974 | Szabo | |
| 4,281,951 A | * | 8/1981 | Baker et al. | |
| 4,544,050 A | * | 10/1985 | Seynhaeve | |
| 4,589,163 A | * | 5/1986 | Weatherby et al. | |
| 4,775,072 A | * | 10/1988 | Lundblade et al. | |
| 4,928,800 A | * | 5/1990 | Green | |
| 5,504,974 A | * | 4/1996 | Graber | |
| 5,855,408 A | * | 1/1999 | Rickabus | |
| 6,076,233 A | * | 6/2000 | Sasaki et al. | |

* cited by examiner

*Primary Examiner*—Lynne H. Browne
*Assistant Examiner*—Tomlyne A Malcolm
(74) *Attorney, Agent, or Firm*—Brooks & Kushman P.C.

(57) ABSTRACT

A handle assembly for a lift gate of a vehicle is movable between a stowed position and an extended position. The handle has a grip section and two legs extending from the grip section. The handle is secured within a pocket of an inside panel of the lift gate with the two legs of the handle being pivotally secured to two sides of the pocket. In the stowed position, the grip section is retained within the pocket. In the extended position, the grip section is extended from the pocket. The force of gravity causes the handle to move between the stowed position and extended position as the lift gate is closed and opened, respectfully. A tail gate has handle that is rotatable mounted within a tail gate handle recess pocket.

5 Claims, 2 Drawing Sheets

HANDLE FOR A VEHICLE LIFT GATE

CROSS-REFERENCE TO RELATED APPLICATIONS

This application claims the benefit of U.S. provisional application Ser. No. 60/121,992 filed Feb. 27, 1999.

TECHNICAL FIELD

The present invention relates to a handle for a vehicle lift gate.

BACKGROUND OF THE INVENTION

Vehicle lift gates are large vehicle closure panels generally located at the rear of a vehicle. Lift gates are used on station wagons, sport utility vehicles, minivans and hatchback style vehicles. They are hinged at their top edge and extend across substantially the entire width of the vehicle. The large size of lift gates makes them heavy and somewhat difficult to open and close. Most lift gates have springs or pneumatic lift assist mechanisms to aid in the opening and closing process.

Handles are generally provided on lift gates to provide a convenient way to grasp the lift gate. Normally lift gates are lifted by gripping an exterior body flange or handle. The weight of the lift gate is balanced by springs or pneumatic lift assist mechanisms that reduce the force necessary to raise the lift gate. The force applied by the lift assist mechanism must be overcome when the lift gate is closed. To close a lift gate a person may push down on the exterior of the lift gate but this may not be convenient for a child or person of short stature. Also if a person wants to close the lift gate from inside the vehicle it is not possible to pull the lift gate closed without a handle.

Handles provided inside a lift gate may comprise simple straps that form loops that are not conveniently grasped and do not provide good leverage. If a lare easily gripped handle is provided, they tend to take up space within the vehicle interior and extend into critical storage space. If a smaller handle is provided the handle becomes harder to grip.

These and other problems are addressed by the lift gate handle deployment system of the present invention as summarized below.

SUMMARY OF THE INVENTION

The present invention relates to a handle assembly for a lift gate comprising a handle that is secured within a handle pocket that is in turn formed by or secured to an inside panel of the lift gate. The handle has a grip section and two generally perpendicularly extending legs extending in the same direction with one leg being located on each end of the grip section. The legs are pivotally secured within the handle pocket. The handle has two positions, a stowed position in which the grip section and legs are retained within the handle pocket and an extended position in which the grip section and part of the legs are extended from the handle pocket. The handle is retained in the stowed position by gravity when the lift gate is closed and is shifted to the grip position by gravity when the lift gate is opened so that it hangs below the handle pocket. When the handle is extended from the handle pocket is easy to grip and can be used to pull the lift gate down against the force applied by the lift gate lift assist mechanism. When the lift gate is in its closed position, the handle is contained within the handle pocket so that it does not take up interior space unnecessarily.

The lift gate may be used in conjunction with a tail gate that folds down. The tail gate may include a rotatable bar handle that may be easily gripped and can rotate as the tail gate is moved from the open position to the closed position.

BEST MODE FOR CARRYING OUT THE INVENTION

Figure 1:
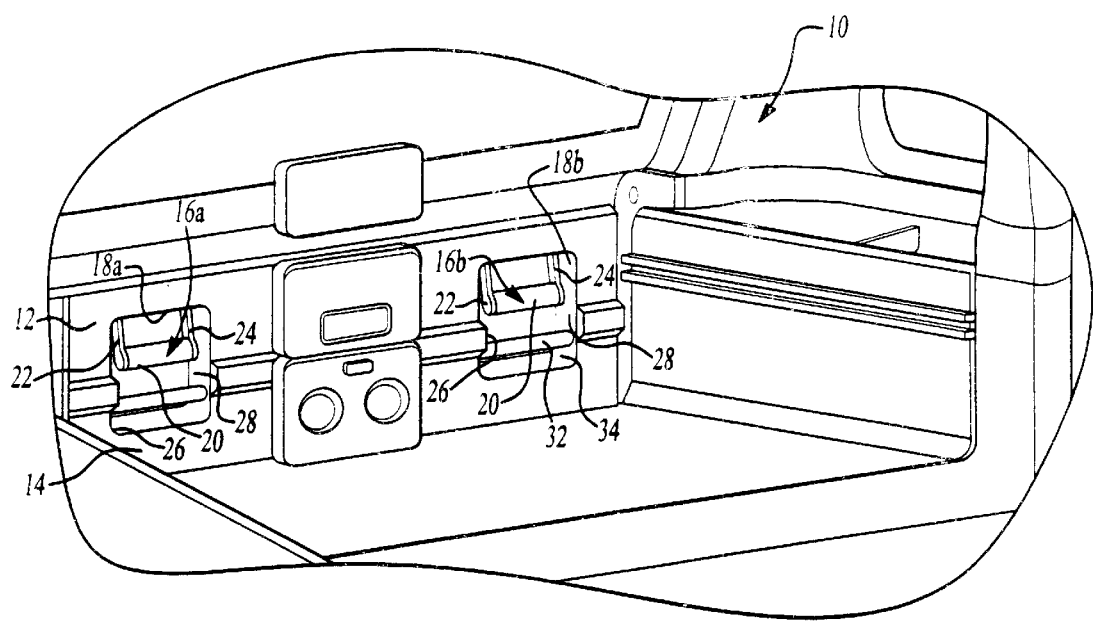
FIG. 1 is a front perspective view showing the lift gate handles and tail gate handles when the lift gate and tail gate are in their closed position.

Referring now to FIG. 1, a vehicle 10 having a lift gate 12 and a tail gate 14 is shown. The lift gate 12 is provided with two handles 16a and 16b that are pivotally attached to the handle pockets 18a and 18b assembled to an inner panel 19 of the lift gate 12. Each of the handles 16a and 16b include a grip section 20 and right and left legs 22 and 24, respectively, that are attached to right and left sides 26 and 28, respectively, of the handle pockets 18a and 18b.

Figure 2:
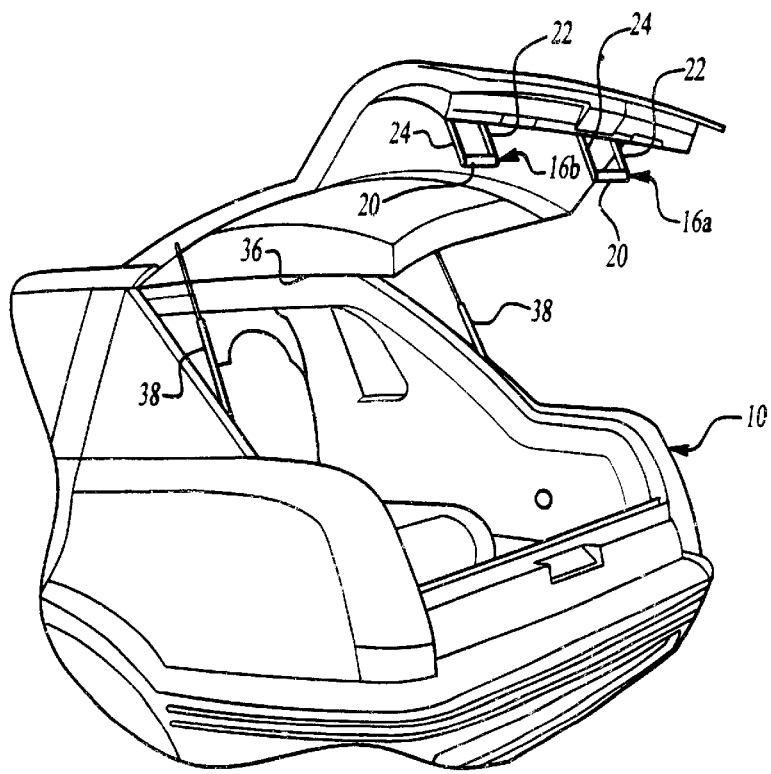
FIG. 2 is a rear perspective view of the lift gate shown with the lift gate in the raised position with the handles in the extended position.

Referring to FIGS. 1 and 2, the two positions of the handles 16a and 16b are shown with FIG. 1 showing the handles 16a and 16b being retained within the pockets 18a and 18b by the force of gravity holding the handles within the pockets 18a and 18b. When the lift gate is raised to the position shown in FIG. 2, the handles 16a and 16b pivot downwardly by the force of gravity to their extended position wherein the grip section 20 is outside of the pockets 18a and 18b and the legs 22 and 24 are partially outside of the pockets 18a and 18b.

Figure 3A:
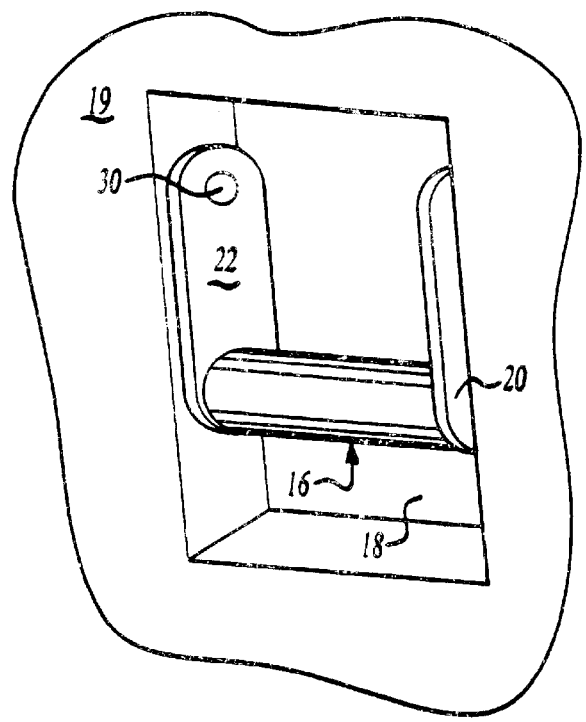
FIG. 3A is a diagrammatic view showing the lift gate handle pivoted to the extended position when the lift gate is open.
Figure 3B:
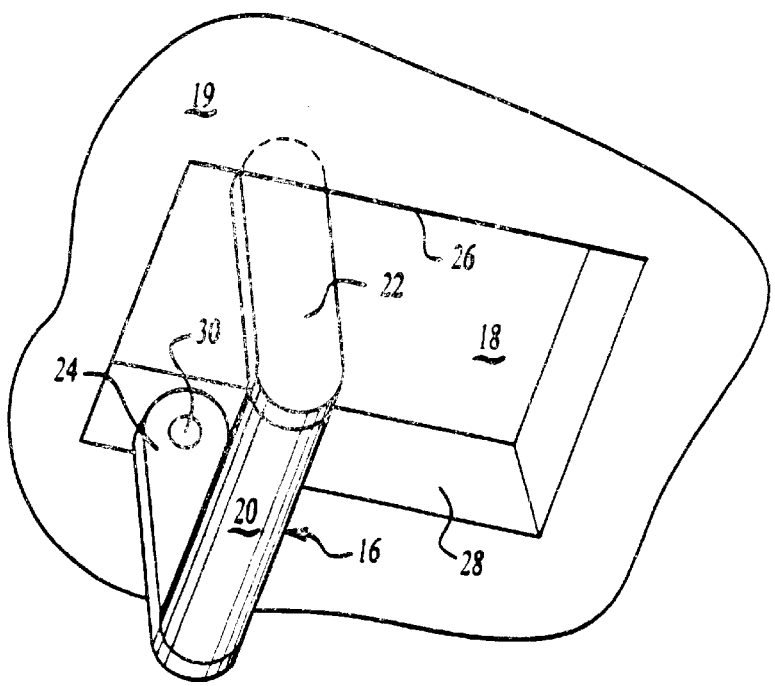
FIG. 3B is a diagrammatic view showing the lift gate handle in the stowed position when the lift gate is closed.

Referring to FIGS. 3A and 3B, the attachment mechanism whereby the handles 16a and 16b are secured to the pockets 18a and 18b is shown. For brevity, the handles are both referenced by reference numeral 16 and the pockets are both referenced by reference numeral 18. FIG. 3A shows the handle 16 in its stowed position corresponding to FIG. 1. FIG. 3B shows the handle 16 in its extended position corresponding to FIG. 2.

The handle 16 includes grip section 20 and legs 22 and 24 on opposite sides of the grip section 20. The legs 22 and 24 extend in the same direction and generally perpendicular to the grip section 20. It will be readily understood by one of ordinary skill in the art that the legs 22 and 24 could extend from the grip section 20 at an angle not necessarily perpendicular to the grip section 20 which would also be within the scope of the present invention. A pivot pin 30 is provided to connect each of the legs 22 and 24 to the right and left sides 26 and 28 of the pocket 18. Pivot pin 30 may be formed as part of the legs 22 and 24 or may be assembled to the legs 22 and 24.

Referring to FIGS. 1 and 2, the tail gate 14 is provided with a tail gate handle 32 that is rotatably mounted within a tail gate handle recess pocket 34. The tail gate 14 is moveable between a raised position shown in FIGS. 1 and 2 and a lowered position that is not shown. The tail gate handle 32 is rotatable to allow a person to firmly grip the handle throughout the process of raising and lowering the tail gate 14.

The lift gate 12 is connected on an upper edge 36 by a hinge (not shown) as is well known in the art to the vehicle 10. Lift assist pneumatic cylinders 38 are provided on opposite sides of the lift gate to aid in lifting the lift gate 12.

The preceding description is of a preferred embodiment of the present invention and should not be read in a limiting sense. The broad scope of the present invention should be construed in conjunction with the following claim.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A handle assembly in combination with a lift gate, the handle assembly comprising:
    a handle having a grip section and two legs extending from the grip section;
    a pocket secured to an inside panel of the lift gate, the two legs of the handle being pivotally secured to two sides of the pocket;
    said handle having two positions, a stowed position in which the grip section is retained within the pocket and an extended position in which the grip section is extended from the pocket, said handle being retained in the stowed position by gravity when the lift gate is closed and being shifted to the extended position by gravity when the lift gate is opened.

2. The combination of claim 1 wherein the legs are connected to the pocket by a pivot pin.

3. The combination of claim 2 wherein the pivot pin is assembled to the legs and pocket.

4. A lift gate for a vehicle that is moveable between a closed position and an open position and being hinged on an upper edge to the vehicle, the lift gate comprising:
    an inner panel having a pocket;
    a handle having a grip section and two legs extending from the grip section that are secured to the pocket, the two legs of the handle being pivotally secured to two sides of the pocket;
    said handle having two positions, a stowed position in which the grip section is retained within the pocket and an extended position in which the grip section is extended from the pocket, said handle being retained in the stowed position by gravity when the lift gate is closed and being shifted to the extended position by gravity when the lift gate is opened.

5. A vehicle having a lift gate and a tailgate for closing a rear opening of the vehicle, the lift gate being moveable between a closed position and an open position and being hinged on an upper edge to the vehicle, the lift gate having an inner panel having a pocket, a handle having a grip section and two legs extending from the grip section that are secured to the pocket, the two legs of the handle being pivotally secured to two sides of the pocket, said handle having two positions, a stowed position in which the grip section is retained within the pocket and an extended position in which the grip section is extended from the pocket, said handle being retained in the stowed position by gravity when the lift gate is closed and being shifted to the extended position by gravity when the lift gate is opened, the tail gate having a tail gate handle that is rotatably mounted within a tail gate handle recess pocket, the tail gate being moveable between a raised position and a lowered position, the handle being rotatable to allow a person to firmly grip the handle throughout the process of raising and lowering the tail gate.

* * * * *